United States Patent
Singh

(10) Patent No.: US 9,306,682 B2
(45) Date of Patent: Apr. 5, 2016

(54) SYSTEMS AND METHODS FOR A SELF-OPTIMIZING DISTRIBUTED ANTENNA SYSTEM

(75) Inventor: Baljit Singh, San Jose, CA (US)

(73) Assignee: CommScope Technologies LLC, Hickory, NC (US)

(*) Notice: Subject to any disclaimer, the term of this patent is extended or adjusted under 35 U.S.C. 154(b) by 643 days.

(21) Appl. No.: 13/554,307

(22) Filed: Jul. 20, 2012

(65) Prior Publication Data

US 2014/0024402 A1    Jan. 23, 2014

(51) Int. Cl.
```
H04B 17/12     (2015.01)
H04B 17/23     (2015.01)
H04W 16/18     (2009.01)
H04W 88/08     (2009.01)
H04W 24/02     (2009.01)
```

(52) U.S. Cl.
CPC .............. H04B 17/23 (2015.01); H04B 17/12 (2015.01); H04W 16/18 (2013.01); H04W 24/02 (2013.01); H04W 88/085 (2013.01)

(58) Field of Classification Search
CPC .... H04B 17/00; H04W 24/02; H04W 88/085; H04W 17/12; H04W 17/23; H04W 16/18
USPC .......... 455/67.11, 63.11, 77, 67.13, 501, 522; 370/318
See application file for complete search history.

(56) References Cited

U.S. PATENT DOCUMENTS

| | | | |
|---|---|---|---|
| 2004/0264602 A1* | 12/2004 | Lewis | 375/324 |
| 2008/0058018 A1 | 3/2008 | Scheinert | |
| 2009/0061940 A1 | 3/2009 | Scheinert et al. | |
| 2010/0062721 A1* | 3/2010 | Le Guillou et al. | 455/67.11 |
| 2011/0306380 A1* | 12/2011 | Zavadsky et al. | 455/522 |
| 2012/0129566 A1 | 5/2012 | Lee et al. | |
| 2013/0028218 A1 | 1/2013 | Chun et al. | |
| 2013/0201916 A1* | 8/2013 | Kummetz et al. | 370/328 |

FOREIGN PATENT DOCUMENTS

JP    2011041001    2/2011
WO    WO 2011156465 A1 * 12/2011

OTHER PUBLICATIONS

Korean Intellectual Property Office, "International Search Report and Written Opinion", "From PCT Counterpart of U.S. Appl. No. 13/554,307", Oct. 18, 2013, pp. 1-11, Published in: WO.
Stratford, "Systems and Methods for Adjusting System Tests Based on Detected Interference", "U.S. Appl. No. 13/433,407", Mar. 29, 2012, pp. 1-30.

* cited by examiner

Primary Examiner — Raymond Dean
(74) Attorney, Agent, or Firm — Fogg & Powers LLC

(57) ABSTRACT

Systems and methods for a self-optimizing distributed antenna system are provided. In certain embodiments, a distributed antenna system comprises a host unit configured to control the operation of the distributed antenna system; and a plurality of remote units coupled to the host unit. In at least one embodiment, a remote unit in the plurality of remote antenna units comprises a scanning receiver configured to receive signals in a plurality of frequency bands; at least one transceiver configured to transmit and receive signals in a frequency band in the plurality of frequency bands; and a remote unit controller configured to control an uplink gain level of the at least one transceiver and tune the scanning receiver to a frequency band in the plurality of frequency bands.

38 Claims, 7 Drawing Sheets

SYSTEMS AND METHODS FOR A SELF-OPTIMIZING DISTRIBUTED ANTENNA SYSTEM

BACKGROUND

A Distributed Antenna System (DAS) is a network of spatially separated antenna nodes connected to a common node via a transport medium that provides wireless service within a geographic area or structure. Common wireless communication system configurations employ a host unit as the common node, which is located at a centralized location (for example, at a facility that is controlled by a wireless service provider). The antenna nodes and related broadcasting and receiving equipment, located at a location that is remote from the host unit (for example, at a facility or site that is not controlled by the wireless service provider), are also referred to as "remote units." Radio frequency (RF) signals are communicated between the host unit and one or more remote units. In such a DAS, the host unit is typically communicatively coupled to one or more base stations (for example, via wired connections or via wireless connection) which allow bidirectional communications between wireless subscriber units within the DAS service area and communication networks such as, but not limited to, cellular phone networks, the public switch telephone network (PSTN) and the Internet. A DAS can provide, by its nature, an infrastructure within a community that can scatter remote units across a geographic area for providing wireless services across that area.

When a DAS is deployed, the different remote units are placed in different environments. In particular, each remote unit is located at a position that is subject to a different radio frequency environment. Frequently, these different environments are caused by the different RF signal sources located in the RF environment. For example, RF signal sources include wireless terminals in communication with the DAS, other remote units in the DAS, sources that provide interfering RF energy, and the like. The different RF environments associated with the individual remote units can negatively affect the operation of the DAS.

For the reasons stated above and for other reasons stated below which will become apparent to those skilled in the art upon reading and understanding the specification, there is a need in the art for systems and methods for adjusting the remote units after deployment to adapt to different operating environments.

SUMMARY

The Embodiments of the present invention provide methods and systems that address the adjusting of the remote units to adapt the different remote units to different operating environments and will be understood by reading and studying the following specification.

Systems and methods for a self-optimizing distributed antenna system are provided. In certain embodiments, a distributed antenna system comprises a host unit configured to control the operation of the distributed antenna system; and a plurality of remote units coupled to the host unit. In at least one embodiment, a remote unit in the plurality of remote antenna units comprises a scanning receiver configured to receive signals in a plurality of frequency bands; at least one transceiver configured to transmit and receive signals in a frequency band in the plurality of frequency bands; and a remote unit controller configured to control an uplink gain level of the at least one transceiver and tune the scanning receiver to a frequency band in the plurality of frequency bands.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments described in the present disclosure provide for a distributed antenna system (DAS) that is able to adjust the operation of the remote units according to the spectral environment in which the different remote units are deployed. For example, during the startup phase of the DAS, each remote unit scans the spectral environment for each frequency band assigned to the individual remote unit. The remote units will identify if a base station or other interfering signal is present. Further, the DAS uses the remote units to compare the transmission power of the separate remote units against one another. A system controller of the DAS uses information gathered through the remote units to adjust the transmission power and uplink gain during the startup phase of the DAS.

Also, the DAS adjusts the operation of the remote units to different spectral environments during the operational phase of the DAS. In the operational phase, the system controller uses information provided by the main transceivers in the remote units to adjust the performance. For example, remote units monitor uplink signal strength and keep record of how often a limiter in the main transceiver engages. If the limiter engages enough times within a time period, the uplink gain of the transceiver is adjusted. Further, If one of the remote units experiences a failure, an alarm is generated and the system controller adjusts the performance of neighboring remote units to compensate for the failure, until the failed remote unit can be fixed or replaced.

Figure 1:
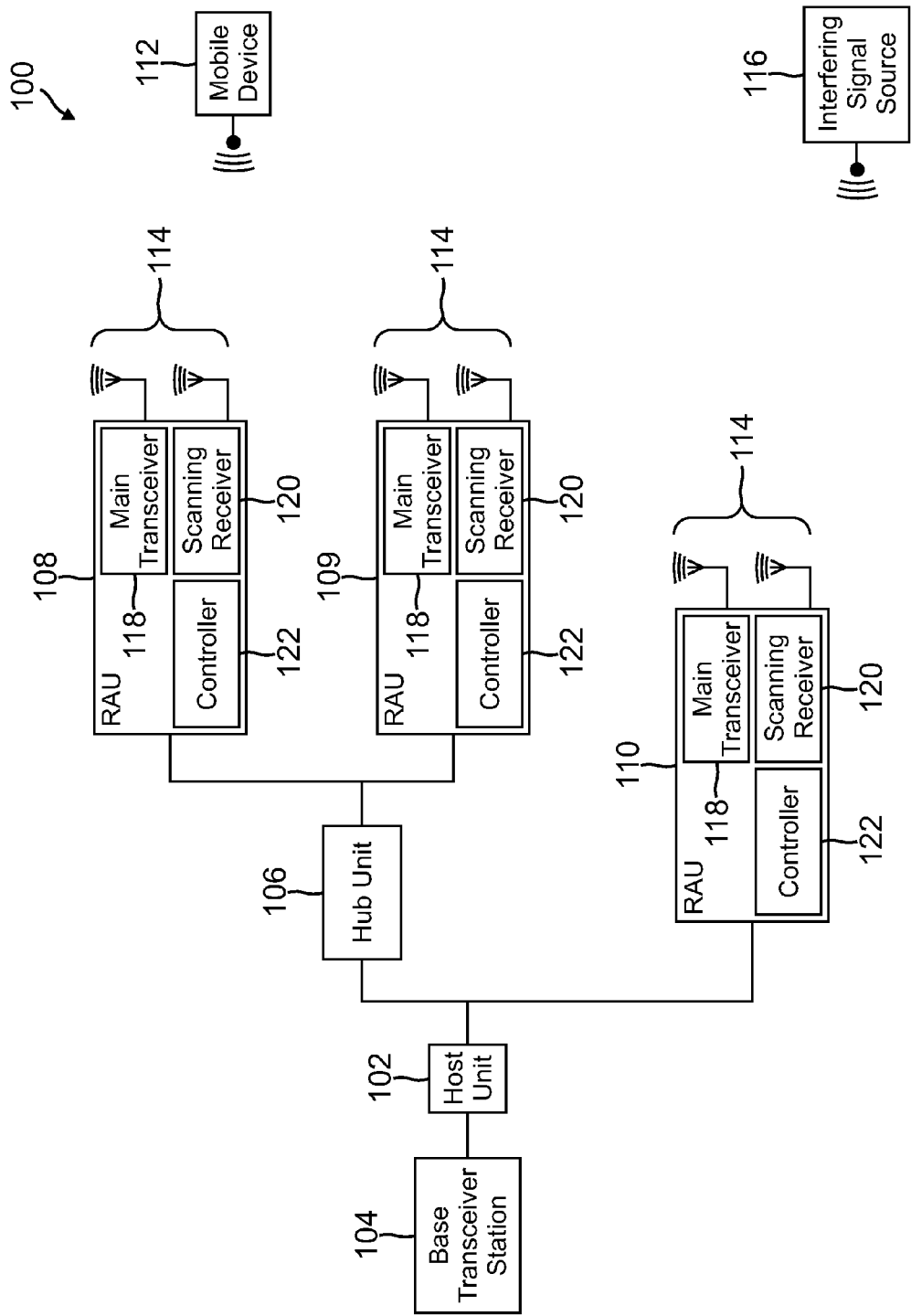
FIG. 1 is a block diagram illustrating a distributed antenna system according to one embodiment.

FIG. 1 illustrates one embodiment of a distributed antenna system (DAS) 100 for receiving and distributing radio frequency signals within a coverage area in one embodiment described in the present disclosure. DAS 100 shown in FIG. 1 includes a host unit 102 coupled to a plurality of remote units 108-110. Host unit 102 and remote units 108-110 are communicatively coupled together via a plurality of communication links. In certain implementations, a hub unit 106 is coupled between remote units 108-110 and host unit 102, where hub unit 106 relays signals between host unit 102 and remote units 108-110. For example, hub unit 106 receives a downstream signals from host unit 102 and distributes the downstream signals to remote units 108-110. Further, hub unit 106 receives upstream signals from remote units 108-110 and combines them into a composite signal that is provided to host unit 102.

In one embodiment, host unit 102 is communicatively coupled to hub unit 106 and remote units 108-110 with a fiber optic cable. Optionally, host unit 102 is coupled to hub unit 106 and remote units 108-110 through a coaxial cable, a combination of both coaxial cable and fiber optic cable, wireless millimeter wave links (e.g. E Band/70 GHz radio), or wireless microwave radio links. Suitable transmission devices (e.g., optical transceiver, millimeter signal transceivers, microwave radio transceiver) can be coupled to hub unit 106, remote units 108-110 and host unit 102 for transmission over a given medium. Remote units 108-110 include electronic components to wirelessly transmit and receive modulated radio frequency (RF) communications via antennas 114 between one or more mobile devices 112.

In certain embodiments, host unit 102 is coupled to at least one base transceiver station (BTS) 104. BTS 104 communicates voice and other data signals between the respective host unit 102 and a larger communication network (for example, the public switched telephone network, wireless service provider networks, or the Internet). In one embodiment, DAS 100 comprises part of a cellular telephone network and mobile devices 112 are cellular telephones. BTS 104 and host unit 102 are interconnected via coaxial cable, fiber optic cable, wireless communication links, or any combination thereof.

For downstream communication signals, BTS 104 generates a downstream RF signal for transmission to a mobile device 112 and sends the downstream RF signal to host unit 102. In another example, instead of generating an RF signal, BTS 104 can generate baseband digital RF samples and send the baseband digital RF samples to host unit 102. Generally, host unit 102 receives the downstream signal from BTS 104 and generates a downstream transport signal from the downstream signal received from BTS 104.

The downstream transport signal is sent, via hub unit 106, to one or more of remote units 108-110. Alternatively, host unit 102 sends the downstream transport signal directly to remote units 108-110. In at least one example, the downstream transport signal is simulcast to remote units 108-110. A remote unit 108-110 receives the downstream transport signal and constructs a downstream RF signal from the downlink transport signal. Remote units 108-110 then radiate the downstream RF signal from antennas 114 coupled to Remote units 108-110.

In the uplink, upstream RF signals can be received at one or more remote units 108-110 from a mobile device 112. Remote units 108-110 generate an upstream transport signal based on the upstream RF signals received. Remote units 108-110 send the upstream transport signals to hub unit 106. In one embodiment, hub unit 106 receives the upstream transport signals from remote units 108 and 109 and sums the received upstream transport signals to create a summed upstream transport signal. The summed upstream transport signal is then sent from hub unit 106 to host unit 102. Host unit 102 receives an upstream transport signal from each of remote units 108-110 and any summed upstream transport signals received from hub unit 106 and sums the upstream transport signals together to form a further summed upstream transport signal. Host unit 102 then sends the summed upstream transport signals to a BTS 103 over a broadband transport medium, such as a coaxial cable, fiber optic cable, or wireless medium.

In certain embodiments, because each remote unit 108-110 in DAS 100 is in a different RF environment, DAS 100 is able to adapt the performance of the individual remote units 108-110 according to the particular RF environment associated with individual remote units 108-110. For example, one exemplary remote unit 110 in DAS 100 may receive a strong in-band signal from an interfering signal source 116, such as another DAS or RF transmitter. Further, two remote units 108-109 can be located proximate to one another such that when one of remote units 108-109 transmits a downstream RF signal, the transmitted downstream RF signal interferes with an upstream RF signal received by the other remote unit. Also, a remote unit 108 may be located proximate to mobile device 112, such that when mobile device 112 transmits, the upstream RF signal is received by remote unit 108 at a power level that causes amplifiers in remote unit 108 to saturate or distort the received upstream RF signal.

To adapt the performance of the individual remote units 108-110 to the different environments containing remote units 108-110, remote units 108-110 include a scanning receiver 120 in conjunction with one or more main transceivers 118 and a remote unit controller 122 that controls the operation of scanning receiver 120 and main transceivers 118. For example, remote unit controller 122 controls the gain of both the downstream and upstream transport signals through main transceiver 118. Further, remote unit controller 122 controls the frequency band that is being received by scanning receiver 120. In some implementations, controller 122 includes logic to receive measurements of upstream and downstream power from main transceiver 118 and scanning receiver 120 and adjust the gain of main transceiver 118 accordingly. In an alternative implementation, controller 122 communicates with host unit 102 or other system controller that manages the operation of DAS 100. For example, controller 122 sends measurements of received and transmitted power to host unit 102 and receives commands from host unit 102 that instruct controller 122 to adjust the settings of main transceiver 118 and scanning receiver 120. Through controller 122, DAS 100 is able to adjust the performance of each individual remote unit 108-110 according to the environment containing each remote unit 108-110.

As mentioned above, DAS 100 is able to adjust performance of remote units 108-110 to adapt the performance of DAS 100 to a particular RF environment. For example, DAS 100 is able to adjust the transmission power of main transceivers 118 to overcome interfering signals transmitted from an interfering signal source 116. To adjust the transmission power of main transceivers 118, each remote unit 108-110 includes a scanning receiver 120. Scanning receiver 120 is controlled by controller 122 and, in certain implementations, operates during the startup phase of DAS 100. When scanning receiver 120 operates during the startup phase of DAS 100, controller 122 directs scanning receiver 120 to check multiple frequency bands for interfering signals in the environment. If there are interfering signals present, scanning receiver 120 measures the power of the interfering signal. As scanning receiver 120 checks multiple frequency bands for interfering signals, scanning receiver 120 sends results to controller 122. Controller 122 compiles the results into an information table that indicates whether or not an interfering signal is present at a particular frequency band and the power of any interfering signals present at particular frequency bands. When scanning receiver 120 has completed checking the RF environment of remote unit 108-110 for interfering signals, controller 122 sends the compiled information table to host unit 102 or another system controller. Host unit 102 then determines the transmission gains for main transceiver 118 associated with scanning receiver 120 and sends information back to controller 122 that directs controller 122 to set the gains for the different frequency bands transmitted and received by main transceiver 118. The DAS 100 sets the gains of main transceiver 118, such that signals transmitted by main transceiver 118 will be able to overcome interfering signals within the coverage area of the associated remote unit 108-110.

Further, during startup, DAS 100 adjusts the transmission power of different remote units 108-110 to prevent transmissions from different remote units 108-110 from interfering with one another. For example, when DAS 100 is adjusting the performance of remote unit 108 and remote unit 109 to prevent transmissions from different remote units 108-110 from interfering with one another, host unit 102 or a system controller will direct main transceiver 118 on remote unit 108 to transmit a signal at a particular frequency band and fixed signal power. Also, host unit 102 will direct controller 122 on remote unit 109 to tune scanning receiver 120 on remote unit 109 to the same frequency band associated with main transceiver 118 on remote unit 108. Scanning receiver 120 on remote unit 109 will then measure the power of the signal transmitted from remote unit 108 received at remote unit 109 and transmit the information to host unit 102 or the system controller. If the power of the signal transmitted from remote unit 108 is substantially high, such that the transmitted signal from remote unit 108 would interfere with signals received and transmitted at remote unit 109, host unit 102 will direct remote unit 108 to decrease the power of transmitted signals. The adjustment of transmission power between separate remote units 108-110 decreases the amount of interference between separate remote units 108-110. Also, host unit 102 checks the transmission power of other remote units 108-110 in DAS 100 and adjusts the transmission power accordingly.

During the operational phase of DAS 100, remote units 108-110 and DAS 100 use information provided by main transceivers 118 on remote units 108-110 to monitor the strength of upstream signals received from mobile device 112. To monitor the strength of upstream signals, controller 122 maintains a record of how often a limiter in main transceiver 118 engages in response to the strength of the received upstream signal. If the limiter engages more than a predetermined number of times, controller 122 will adjust the upstream gain of main transceiver 118 such that the limiter does not engage. In certain embodiments, the limiter engages a predetermined number of times within a time period before controller 122 adjusts the upstream gain of main transceiver 118. Further, in some implementations, controller 122 adjusts the gain on main transceiver 118 for the frequency band that is receiving the upstream signal that engages the limiter while leaving the gain unadjusted for signals received on the other frequency bands offered by main transceiver 118.

In a further embodiment, DAS 100 adjusts the performance of remote units 108-110 when a remote unit 108-110 fails or communications in a frequency band offered by a remote unit 108-110 becomes unavailable due to a failure in remote unit 108-110. For example, when remote unit 109 fails, controller 122 on remote unit 109 generates an alarm and transmits the alarm to host unit 102 or other system controller. Upon receiving the alarm, host unit 102 sends a command to controllers 122 on remote units 108 and 110 to increase the gain of main transceivers 118 and, thus, increase the coverage area associated with remote units 108 and 110 to compensate for the coverage area lost by the failure of remote unit 109. In a further exemplary implementation, when remote unit 109 experiences a failure that is isolated to a particular frequency band, controller 122 on remote unit 109 generates an alarm that indicates a particular frequency band has failed. Controller 122 also transmits the alarm to host unit 102, where host unit 102 responds by sending commands to remote units 108 and 110 to increase the gain of communications associated with the failed frequency band on remote unit 109. Controllers 122 of remote units 108 and 110 adjust the gain of main receivers 118 associated with the frequency band such that remote units 108 and 110 increase their coverage area associated with the particular frequency to compensate for the coverage area lost by the failure of remote unit 109.

As discussed above, DAS 100 is able to adapt the performance of remote units 108-110 to particular RF environments. For example, DAS 100 adjusts the gain of remote units 108-110 in response to the presence of an interfering signal produced by an interfering signal source 116. Also, DAS 100 adjusts the gain of remote units 108-110 in response to the signal strengths produced by neighboring remote units 108-110. Further, DAS 100 adjusts the gain of remote units 108-110 in response to strong signals produced by a mobile device 112 and, in some implementations, DAS 100 adjusts the transmission gain of remote units 108-110 to compensate for failures in a remote unit in remote units 108-110.

Figure 2:
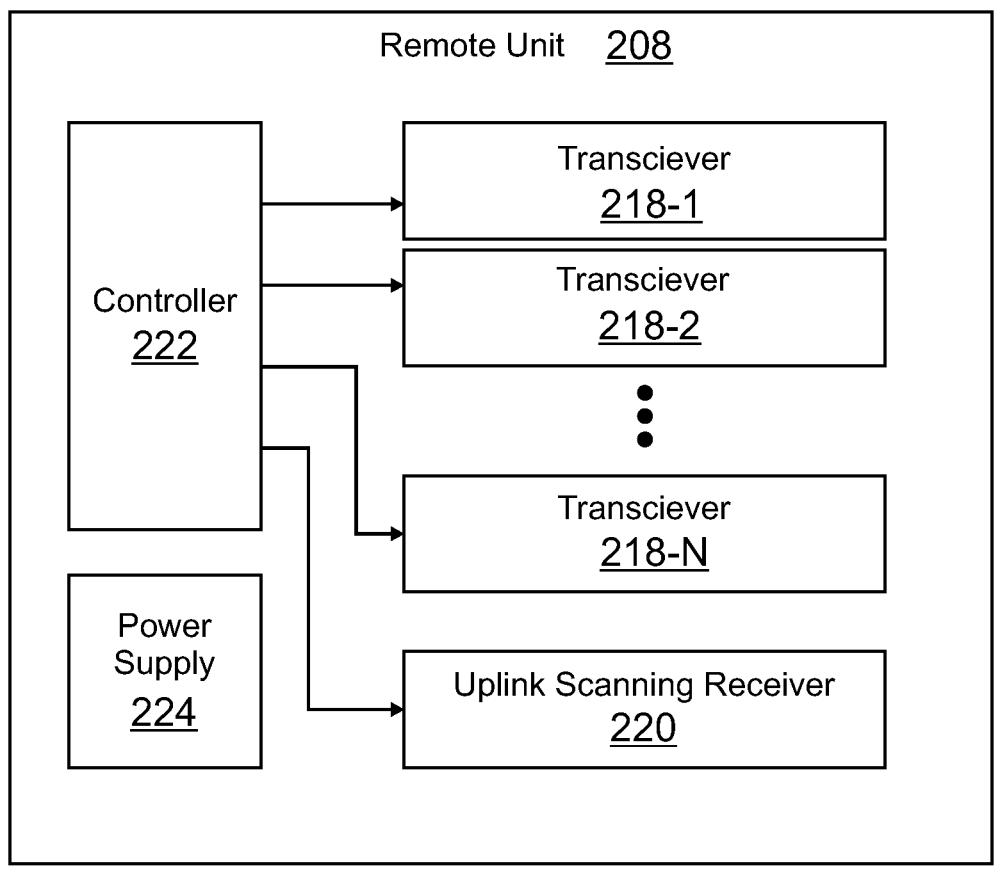
FIG. 2 is a block diagram illustrating a remote unit according to one embodiment.

FIG. 2 is a block diagram illustrating a remote unit 208 according to one embodiment. Remote unit 208 is an implementation of one of remote units 108-110 in FIG. 1. Similar to remote units 108-110, remote unit 208 includes a controller 222 and an uplink scanning receiver 220 that function similarly to the controller 122 and scanning receiver 120 described above in relation to FIG. 1. Further, remote unit 208 includes multiple transceivers 218-1-218-N, where each transceiver 218-2-218-N is dedicated to receiving and transmitting signal communications in a particular frequency band through an antenna 114 connected to antenna ports in remote unit 208. As described above in relation to FIG. 1, remote unit 208 communicates with a host unit 102 or system controller to help DAS 100 adapt to different remote unit environments. To help DAS 100 adapt to different environments, remote unit 208 participates in multiple self-optimizing procedures. DAS 100 adjusts the performance of remote unit 208 in response to a received interfering signal. Also, DAS 100 adjusts the transmission power of multiple remote units that are similar to remote unit 208 in DAS 100. DAS 100 also monitors the power of signals received by remote unit 208 to determine if a strong signal is present. If a strong signal is being received by remote unit 208, DAS 100 adjusts the uplink gain of a transceiver in remote unit 208. Further, DAS 100 alters the performance of other remote units when remote unit 208 becomes unable to transmit or receive through at least one frequency band. In certain embodiments, DAS 100 performs all or a portion of the above described self-optimizing procedures.

As has been described previously, remote unit 208 includes an uplink scanning receiver 220, which functions similarly to scanning receiver 120, described in FIG. 1. Further, uplink scanning receiver 220 offers an uplink receiving path that is separate from the uplink reception paths offered through transceivers 218-1-218-N. During normal operation of remote unit 208, the transceivers 218-1-218-N are able to send and receive signals in up to N different frequency bands. In some implementations, these frequency bands include 700, 800, 900, Cell, PCS, AWS, and the like. When adjusting the performance of remote unit 208 in response to interfering signals, remote unit 208 monitors the RF environment to detect the presence of an interfering signal in the frequency bands used by transceivers 218-1-218-N. To monitor for the interfering signals in each of the different frequency bands, during the startup of DAS 100, controller 120 directs uplink scanning receiver 220 to tune to each of the different frequency bands offered by transceivers 218-1-218-N. Uplink scanning receiver 220 converts the received analog signals for each of the different frequency bands to a digital signal and transmits the digital signals to controller 222 for further processing.

In certain embodiments, controller 222 processes the digital signals received from uplink scanning receiver 220 to build an information table that characterizes the interfering signals present at the frequency bands over which transceivers 218-1-218-N communicate. For example, controller 222 is implemented as a field programmable gate array (FPGA), a digital signal processor (DSP), a general purpose processor, a microcontroller, or the like. Controller 222 processes the digital signal to identify characteristics of the received signal such as whether an interfering signal is present, the frequency of the signal, and the amplitude of the signal. To identify the characteristics of the received signal, controller 222 processes the digital signal by down converting the signal to base band and then applying a fast Fourier transform (FFT), a discrete Fourier transform (DFT), or the like. The data acquired by the digital processing is then compiled in an information table and transmitted to a system controller such as host unit 102.

Upon receiving the information table, the system controller determines what transmission power is needed for transceivers 218-1-218-N to overcome any identified interfering signals. When the system controller determines the transmission power for transceivers 218-1-218-N, the system controller sends any changes to the transmission power to controller 222, where upon, controller 222 changes the gains of transceivers 218-1-218-N according to the transmission power levels determined by the system controller.

In at least one embodiment, controller 222 changes the transmission power of transceivers 218-1-218-N in response to a command from a system controller when DAS 100 is adjusting the transmission power of multiple remote units in relation to one another. To adjust the transmission power of the multiple remote units in relation to one another, the system controller for DAS 100 compares the transmission power of adjacent remote units and determines if one of the remote units is transmitting at a power over a particular frequency band, such that the transmission from a remote unit will interfere with the transmission from other remote units. To determine how to adjust the transmission power of transceivers 218-1-218-N, remote unit 208 receives commands from the system controller to tune uplink scanning receiver 220 to particular frequency bands and also receives commands to transmit signals from separate transceivers 218-1-218-N, which are associated with particular frequency bands.

When remote unit 208 tunes uplink scanning receiver 220 to different frequency bands, controller 222 receives commands from the system controller to tune uplink scanning receiver 220 to a frequency band that corresponds with the frequency of a signal that is transmitted by an adjacent remote unit. Uplink scanning receiver 220 receives the signal from the neighboring remote unit, digitizes it and transmits the signal to controller 222. Controller 222 processes the digitized signal to acquire information about the transmission power of the signal transmitted by the adjacent remote unit. Controller 222 then transmits the information to the system controller, where the system controller uses the information to set the transmission power for the adjacent remote unit. In certain embodiments, the system controller directs controller 222 to tune uplink scanning receiver 220 and acquire power measurements for each frequency band in the adjacent remote unit.

Further, transceivers 218-1-218-N transmit signals in their associated frequency bands, where the transmission power of the signals are measured by an uplink scanning receiver in an adjacent remote unit. In one implementation, transceivers 218-1-218-N transmit their respective signals simultaneously while the uplink scanning receiver in the adjacent remote unit tunes to the frequency bands associated with individual transceivers 218-1-218-N. The adjacent remote unit measures the transmission power at the adjacent remote unit and transmits the measurements to the system controller, the system controller uses the measurements to determine any adjustments that should be made to the transmission power of transceivers 218-1-218-N. If adjustments are to be made, the system controller transmits the adjustments to controller 222. Controller 222 then adjusts the transmission power of transceivers 218-1-218-N. By adjusting the transmission power of transceivers 218-1-218-N based on measurements of power at adjacent remote units, DAS 100 is able to prevent signals transmitted from neighboring remote units from interfering with one another.

Further, as described above, remote unit 208 also adjusts the operation of the transceivers 218-1-218-N during the operational phase of DAS 100. Remote unit 208 adjusts the uplink gain of transceivers 218-1-218-N during the operational phase by monitoring a limiter that engages when an uplink signal received by transceivers 218-1-218-N is greater than a predefined signal level. If the limiter engages too frequently for a particular frequency band, controller 222 decreases the uplink gain of the particular transceiver in transceivers 218-1-218-N that receives the signal that engages the limiter. The adjustments to the operation of transceivers 218-1-218-N based on the engagement of the limiter allow remote unit 208 to compensate for a signal produced by a mobile device that is too close to remote unit 208, or a mobile device that transmits signals at a higher power level.

In certain embodiments, when remote unit 208 experiences a failure, controller 222 on remote unit 208 generates an alarm that notifies the system controller for DAS 100 that a failure has occurred and also indicates the nature of the failure, such that DAS 100 can adjust the performance of remote units adjacent to remote unit 208 to compensate for the failure in remote unit 208. For example, when remote unit 208 experiences a complete failure, an alarm is generated either by remote unit 208, which is subsequently communicated to the system controller, or the alarm is generated by the system controller (in the case that the system controller is unable to communicate with remote unit 208). The system controller will then adjust the performance of adjacent remote units to compensate for the failure of remote unit 208 for all frequency bands provided by remote unit 208. In another exemplary embodiment, the remote unit 208 experiences a failure related to a particular frequency band. To compensate for the failure, remote unit 208 generates an alarm and transmits the alarm to the system controller, where the alarm also indicates the frequency band associated with the failure. The system controller of DAS 100 adjusts the transmission power of adjacent remote units for the frequency band associated with the failure on remote unit 208, such that the adjacent remote units compensate for the failure.

Figure 3:
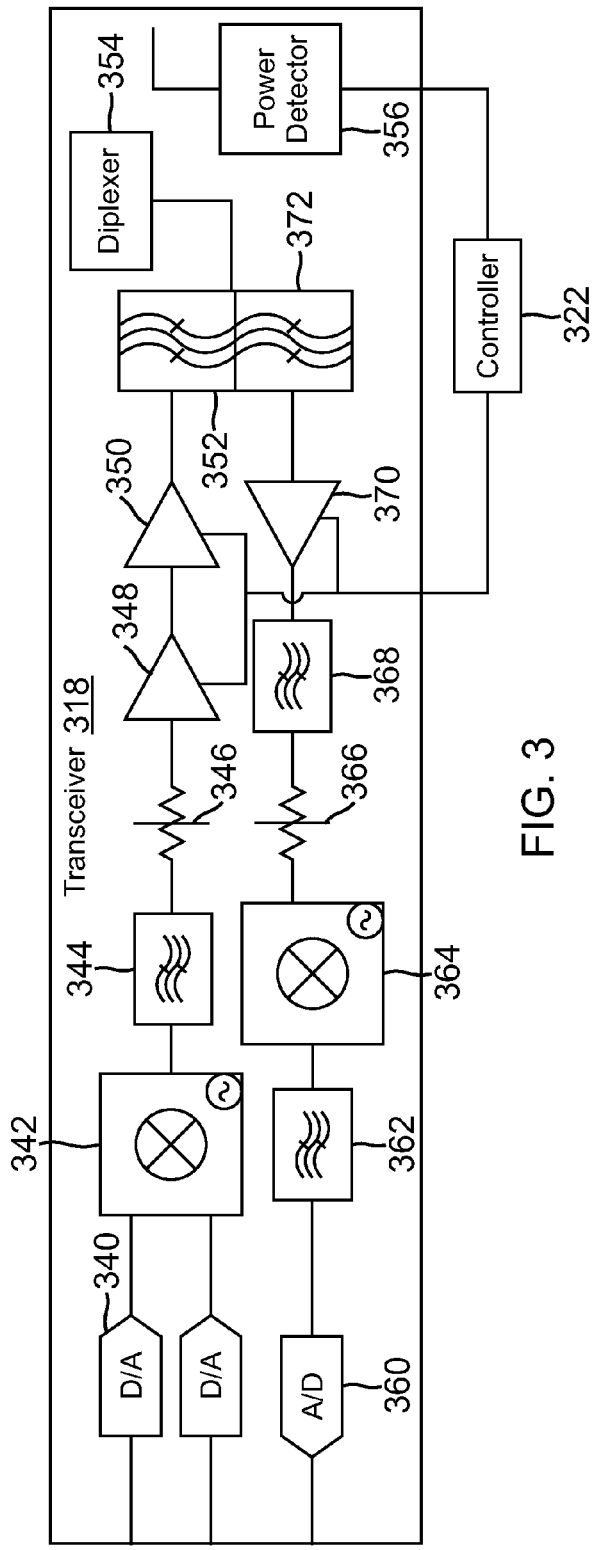
FIG. 3 is a schematic illustration of a transceiver in a remote unit according to one embodiment.

FIG. 3 is a schematic diagram of a transceiver 318 according to one embodiment. In some embodiments, transceiver 318 operates as main transceiver 118 as described above in FIG. 1 or one of transceivers 218-1-218-N in FIG. 2. Transceiver 318 includes a downstream path that is able to convert a digital downstream signal that is at an intermediate frequency to an analog downstream signal that is at a radio frequency. Also, transceiver 318 includes an upstream path that is able to convert an analog upstream signal that is at a radio frequency to a digital upstream signal that is at an intermediate frequency. Further, transceiver 318 includes a diplexer 354 coupled to both the upstream and downstream paths, which diplexer 354 is also coupled to an antenna for transmission and reception of both upstream and downstream radio frequency signals. In at least one embodiment, transceiver 318 includes a power detector 356. Power detector 356 is capable of measuring the power of received signals through the upstream path and the power of signals to be transmitted through the downstream path. Power detector 356 transmits readings of the detected power to a controller 322 such as controller 122 in FIG. 1 or controller 222 in FIG. 2.

In certain embodiments, to convert signals from an analog radio frequency signal to a digital radio frequency signal, the upstream path includes a filter 372 coupled to receive radio frequency signals from diplexer 354. Filter 372 filters the radio frequency signal and passes the filtered signal to an amplifier 370 and another filter 368. In at least one implementation, the level of amplification is controlled by controller 322. After being amplified and filtered by amplifier 370 and filter 368, the signal is attenuated by an attenuator 366 and mixed down to an intermediate frequency by mixer 364. The intermediate frequency is then filtered by filter 362 and then digitally sampled by analog to digital converter 360. The digital samples are then sent to either controller 322 or the system controller of the DAS for down conversion and processing.

In a further embodiment, to convert a signal from a digital intermediate frequency signal to an analog radio frequency signal, the downstream path receives two digital intermediate frequency signals that are converted to analog intermediate frequency signals by digital to analog converters 340. The two analog intermediate frequency signals are then mixed to a radio frequency and combined by mixer 342. After mixing to the radio frequency, the signals are filtered by filter 344 and attenuated by attenuator 346. The downstream signal is then amplified by amplifiers 348 and 350 and then filtered by filter 352. In at least one implementation, the level of amplification is controlled by controller 322. The analog radio frequency signal is then sent to diplexer 354 for transmission through an antenna to a downstream mobile device.

Figure 4:
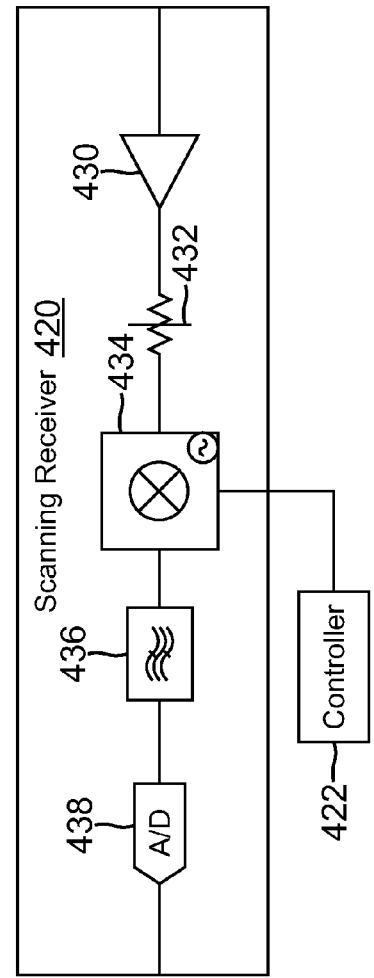
FIG. 4 is a schematic illustration of a scanning receiver in a remote unit according to one embodiment.

FIG. 4 is a schematic diagram of a scanning receiver 420 according to one embodiment. In some embodiments, scanning receiver 420 operates as uplink scanning receiver 220 as described above in FIG. 2 or scanning receiver 120 in FIG. 1. Further, certain components of the scanning receiver 420, as described herein, are controlled by a controller 422, which controller 422, in some embodiments, functions as controller 122 in FIG. 1 or controller 222 in FIG. 2. In certain embodiments, scanning receiver 420 includes an amplifier 430, which amplifier 430 amplifies a signal received from the environment of a remote unit. Further, scanning receiver 420 uses an attenuator 432 to attenuate the signal before mixing the signal to an intermediate frequency using mixer 434. Mixer 434 is tunable through multiple frequency bands such that mixer 434 can mix signals received in a desired frequency band down to the desired intermediate frequency. In at least one implementation, controller 422 controls the tuning frequency of mixer 434. When the signal is mixed down to the intermediate frequency, a filter 436 filters the intermediate frequency signal and analog to digital converter 438 samples the analog intermediate frequency signal to acquire digital samples of the intermediate frequency signal. Scanning receiver 420 provides the digital samples to controller 422. In certain embodiments, scanning receiver 420 provides real and imaginary samples by including two analog to digital converters that digitally sample both an in phase signal and a quadrature signal.

Figure 5:
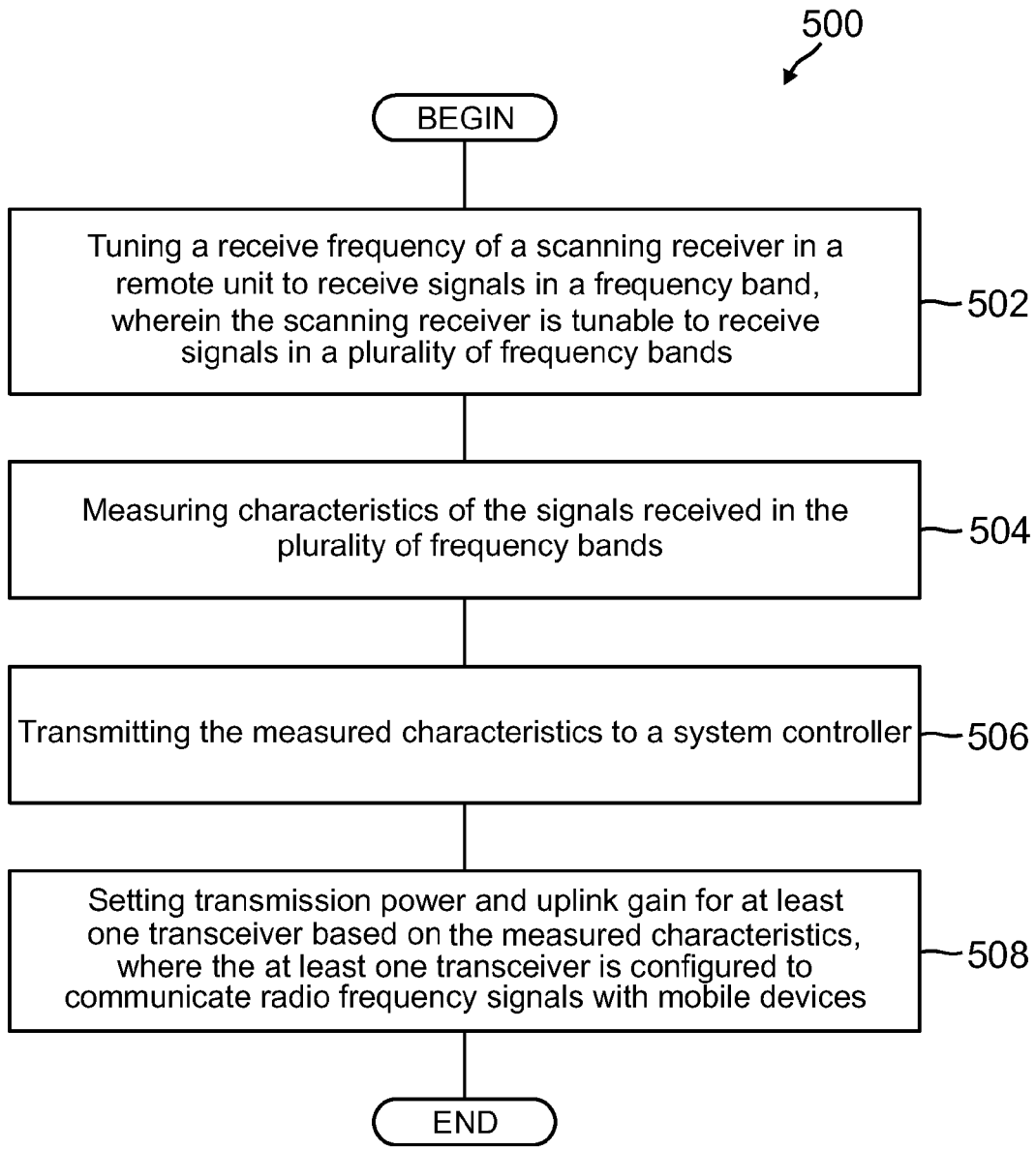
FIGS. 5-8 are flow diagrams of methods for adjusting the performance of a distributed antenna system according to one embodiment.

FIG. 5 provides a flow chart for a method 500 of one embodiment of the present invention for adjusting the performance in a distributed antenna system. The method 500 begins at 502 with tuning a receive frequency of a scanning receiver in a remote unit to receive signals in a frequency band, wherein the scanning receiver is tunable to receive signals in a plurality of frequency bands. For example, a controller in a remote unit tunes the receive frequency of a scanning receiver in a remote unit to receive signals in a frequency band, where the scanning receiver is capable of receiving signals in multiple frequency bands. The method 500 proceeds to 504 with measuring characteristics of the signals received in the plurality of frequency bands. For example, when the scanning receiver receives signals, the scanning receiver digitizes the signals for processing by a controller of the remote unit. The controller processes the digitized signals and gathers characteristics of the signal that describe whether there is an interfering signal present at the frequency band, the frequency of any interfering signals, the amplitude of the interfering signals, and the like.

The method 500 proceeds to 506 with transmitting the measured characteristics to a system controller. In at least one exemplary implementation, the controller of the remote unit transmits the measured characteristics to a system controller that controls the operation of the distributed antenna system. The method 500 proceeds to 508 with setting transmission power and uplink gain for at least one transceiver based on the measured characteristics, where the at least one transceiver is configured to communicate radio frequency signals with mobile devices. For example, the system controller uses the characterization of interfering signals received from the remote units to determine a transmission power level of the transceivers on the remote units that has a large enough magnitude to overcome the measured interference. In at least one implementation, method 600 is performed during a startup phase of the distributed antenna system, before the distributed antenna system begins normal operation.

Figure 6:
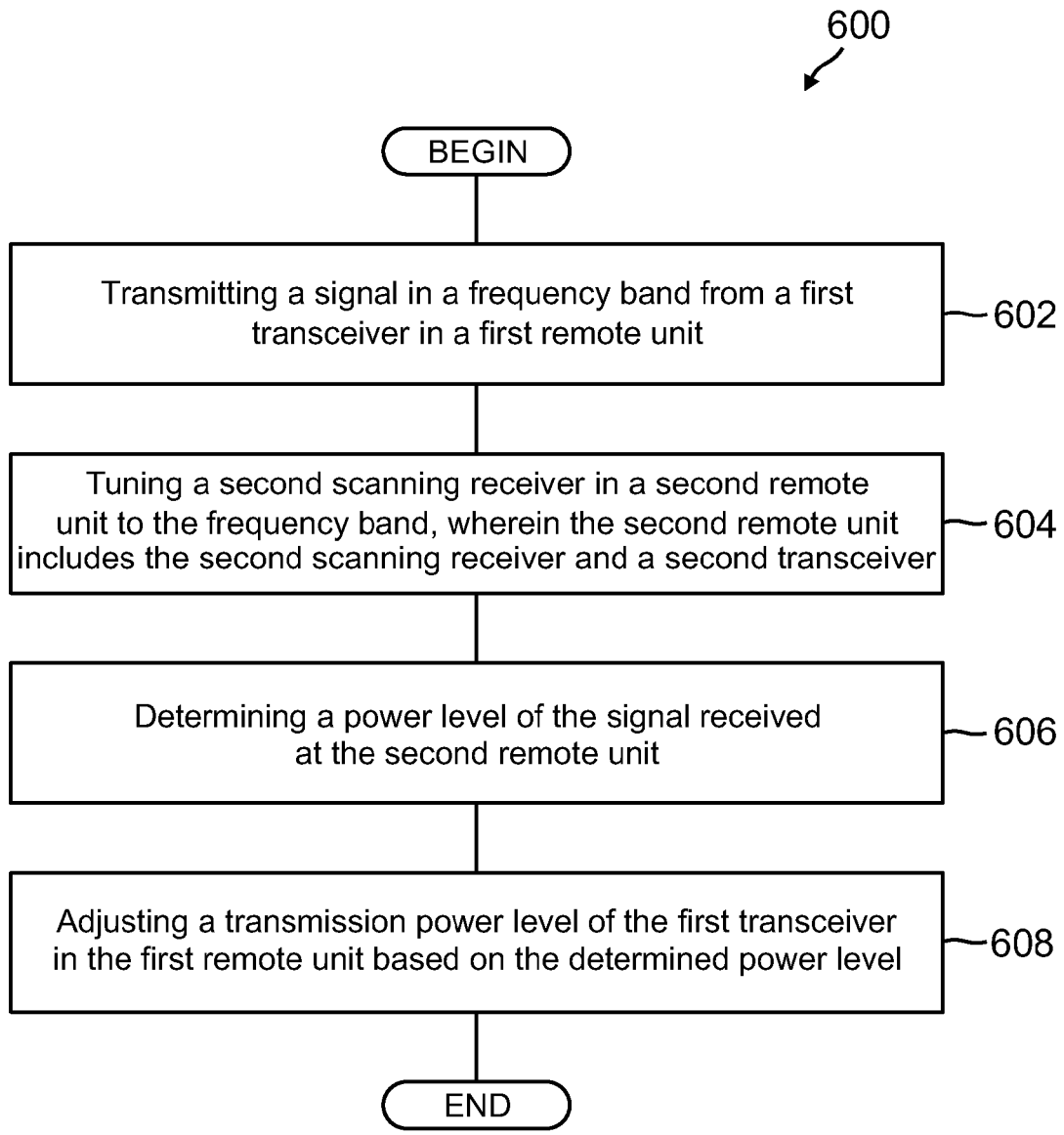

FIG. 6 provides a flow chart for a method 600 of one embodiment of the present invention for adjusting the performance in a distributed antenna system. The method 600 begins at 602 with transmitting a signal in a frequency band from a first transceiver in a first remote unit. For example, a first remote unit transmits a signal, where the frequency of the transmitted signal is in a particular frequency band. The method 600 proceeds to 604 with tuning a second scanning receiver in a second remote unit to the frequency band, wherein the second remote unit includes the second scanning receiver and a second transceiver. For example, on a second remote unit, the controller on the second remote unit tunes a scanning receiver to the same frequency band that is associated with the transmitted signal on the first remote unit.

The method 600 proceeds to 606 with determining a power level of the signal received at the second remote unit. In at least one exemplary implementation, the scanning receiver on the second remote unit digitizes the signal and passes the signal to the controller on the second remote unit. The controller then processes the digitized signal to measure the power level and transmits that information to the system controller of the distributed antenna system. The method 600 proceeds to 608 with adjusting a transmission power level of the first transceiver in the first remote unit based on the determined power level. For example, the system controller adjusts the transmission power of the first remote unit and the second remote unit in relation to each other to prevent signals transmitted from the first and second remote units from interfering with the operation of the first and second remote units. In at least one implementation, the processes described that are associated with method 600 are performed during the startup of the distributed antenna system, before the distributed antenna system begins normal operation.

Figure 7:
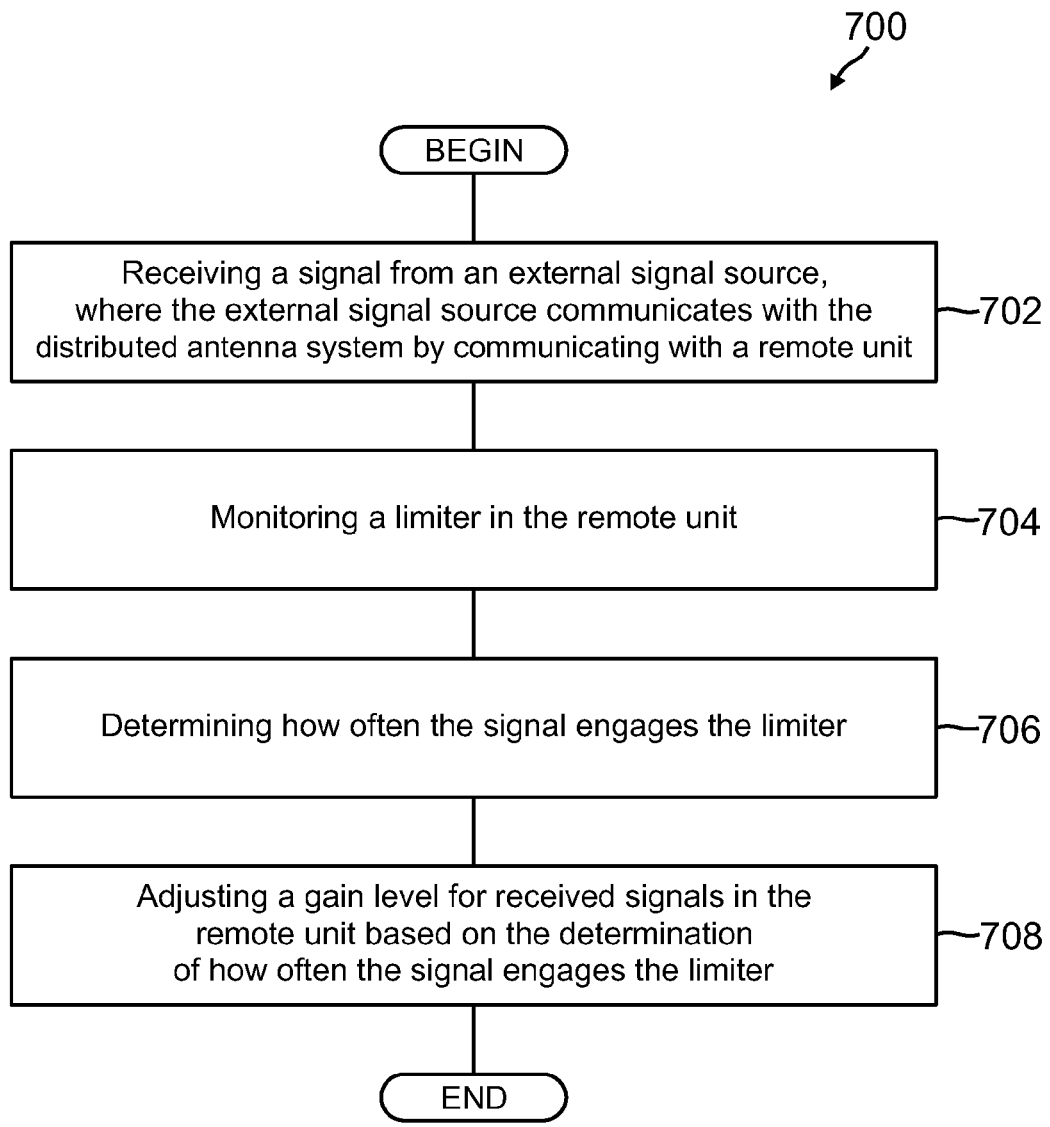

FIG. 7 provides a flow chart for a method 700 of one embodiment of the present invention for adjusting the performance in a distributed antenna system. The method 700 begins at 702 with receiving a signal from an external signal source, where the external signal source communicates with the distributed antenna system by communicating with a remote unit. For example, the transceivers on a remote unit receive a signal from an external signal source, where the external signal source communicates with the distributed antenna system by communicating with a remote unit. For instance, the external signal source could be a mobile device, a cell tower signal, another distributed antenna system, and the like. The method 700 proceeds at 704 with monitoring a limiter in the remote unit. In at least one implementation, the signal received by the transceiver on the remote unit from the external signal source has enough power to engage a limiter in the transceiver, where the limiter is monitored by a controller on the distributed antenna system.

The method 700 proceeds at 706 with determining how often the signal engages the limiter. For example, as the controller monitors the limiter on the transceiver, the controller determines how often the limiter engages for signals received on a particular frequency band. In some implementations, the determination of how often the limiter engages is transmitted to a system controller for the distributed antenna system, like a host unit. The method 700 then proceeds at 708 with adjusting a gain level for received signals in the remote unit based on the determination of how often the signal engages the limiter. For example, either the controller on the remote unit or the system controller for the distributed antenna system can send commands to the transceiver to decrease the gain of the transceiver during normal operation in response to a received signal from an external signal source that engages the limiter too frequently within a period of time. In at least one implementation, the process described in association with method 700 is performed during the normal operation of the distributed antenna system.

Figure 8:
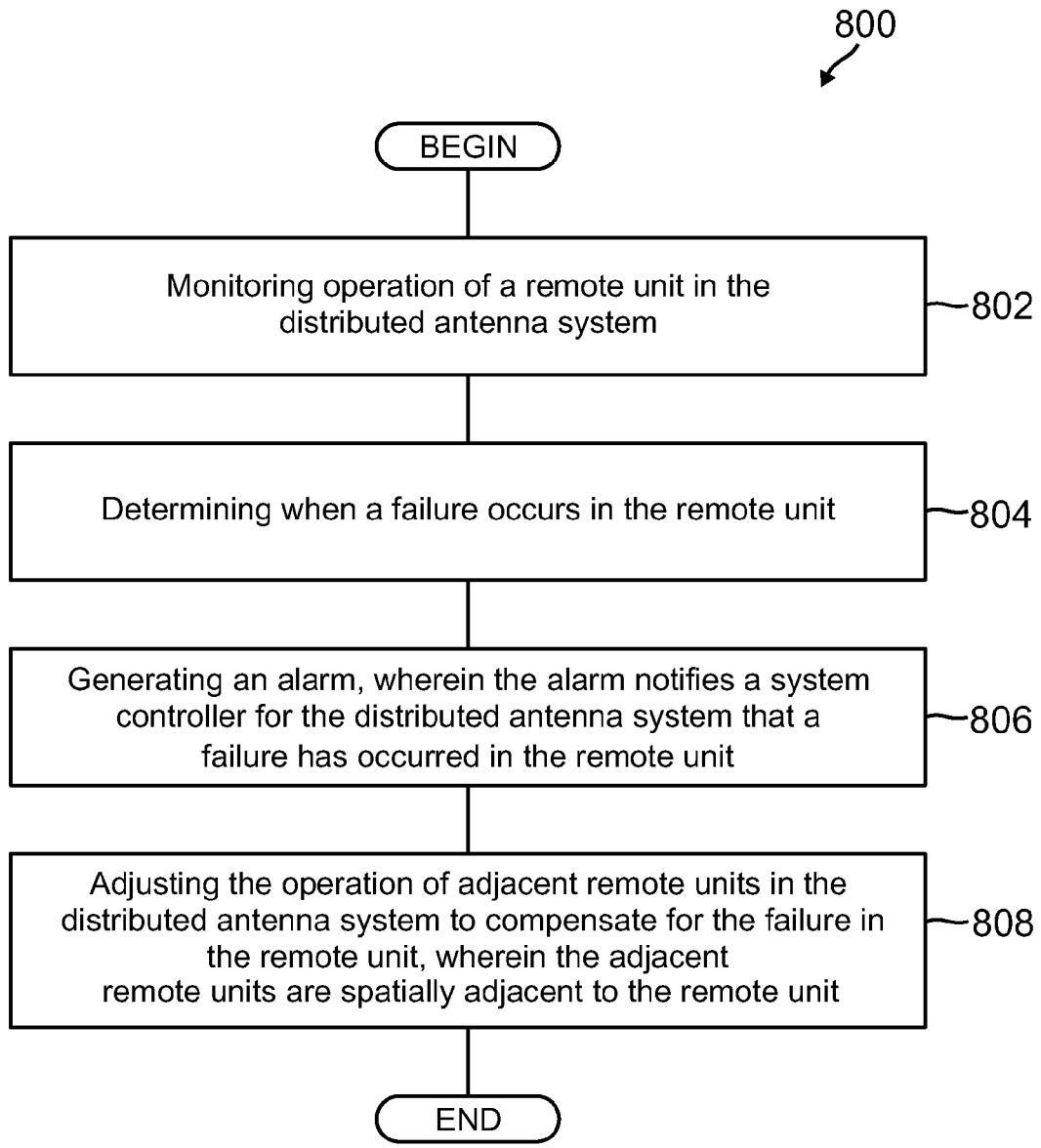

FIG. 8 provides a flow chart for a method 800 of one embodiment of the present invention for adjusting the performance in a distributed antenna system. The method 800 begins at 802 with monitoring operation of a remote unit in the distributed antenna system. For example, a controller on a remote unit monitors the transceivers on the remote unit to verify that they are operating correctly. The method 800 proceeds at 804 with determining when a failure occurs in the remote unit. The method 800 then proceeds to 806 with generating an alarm, wherein the alarm notifies a system controller for the distributed antenna system that a failure has occurred in the remote unit. If a failure occurs on the remote unit, where a failure can be a global failure that affects the entire remote unit or a localized failure that affects a single transceiver, the controller generates an alarm. In at least one implementation, the controller generates the alarm and notifies the system controller that a failure occurred on the remote unit. The method 800 proceeds to 808 with adjusting the operation of adjacent remote units in the distributed antenna system to compensate for the failure in the remote unit, wherein the adjacent remote units are spatially adjacent to the remote unit. For example, when the system controller receives an alarm from a remote unit, the system controller sends commands to remote unit controllers on remote units that are adjacent to the remote unit with the failure to increase the transmission power and receiving gain to compensate for the remote unit failure. In at least one implementation, the processes described in association with method 800 are performed during normal operation of the distributed antenna system.

Example Embodiments

Example 1 includes a method for adjusting performance in a distributed antenna system, the method comprising adjusting the performance of at least one remote unit in the distributed antenna system during a startup phase based on a spectral environment of the at least one remote unit, wherein the spectral environment is monitored with a scanning receiver on the at least one remote unit; and adjusting the performance of the at least one remote unit during a normal operation phase of the at least one remote unit.

Example 2 includes the method of Example 1, wherein adjusting the performance of the at least one remote unit during the startup phase comprises scanning the spectral environment of the at least one remote unit, the at least one remote unit set to scan in at least one frequency band for an interfering signal.

Example 3 includes the method of Example 2, wherein scanning the spectral environment for an interfering signal comprises tuning a receive frequency of a scanning receiver in the at least one remote unit to receive signals in a frequency band in the at least one frequency band; measuring characteristics of the signal received in the frequency band; and transmitting the measured characteristics to a system controller of the distributed antenna system.

Example 4 includes the method of Example 3, wherein adjusting the operation of the at least one remote unit comprises setting transmission power and uplink gain for at least one transceiver in the at least one remote unit, wherein the at least one transceiver is configured to communicate radio frequency signals with mobile devices.

Example 5 includes the method of any of Examples 3-4, wherein tuning the receive frequency comprises tuning the scanning receiver to receive signals in a plurality of different frequency bands.

Example 6 includes the method of any of Examples 3-5, wherein measuring characteristics of the signal comprises determining whether the signal is an interfering signal; determining the frequency of the signal; determining the amplitude of the signal; and compiling the measured characteristics in a transmissible format.

Example 7 includes the method of Example 6, wherein the transmissible format comprises an information table.

Example 8 includes the method of Example 7, further comprising transmitting the information table to a system controller for the remote unit.

Example 9 includes the method of any of Examples 1-8, wherein adjusting the performance of the at least one remote unit during the startup phase comprises comparing reception power of remote unit signals received by at least one remote unit, wherein the remote unit signal was transmitted by a different remote unit in the distributed antenna system.

Example 10 includes the method of Example 9, wherein comparing reception power of remote antenna unit signals comprises transmitting a signal in a frequency band from a transceiver on a first remote unit; tuning a second remote scanning receiver in a second remote unit to the frequency band, wherein the second remote unit includes at least one transceiver; and determining a power level of the signal received at the second remote unit.

Example 11 includes the method of Example 10, wherein adjusting the operation of the at least one remote unit comprises adjusting a transmission power level of the transceiver in the first remote unit based on the determined power level.

Example 12 includes the method of any of Examples 10-11, further comprising transmitting a second signal in a second frequency band from the at least one transceiver in the second remote unit; tuning a first remote scanning receiver in the first remote unit to the second frequency band; determining a second power level of the second signal received at the first remote unit; and adjusting the second transmission power level of the at least one transceiver in the second remote unit based on the second power level.

Example 13 includes the method of any of Examples 1-12, wherein adjusting the performance of the at least one remote unit during the normal operation phase comprises monitoring the power of signals received by the at least one remote unit from an external signal source.

Example 14 includes the method of Example 13, wherein monitoring the power of signals received in the at least one remote antenna unit from the external signal source comprises receiving a signal from the external signal source, wherein the external signal source communicates with the distributed antenna system by communicating with the at least one remote unit; monitoring a limiter in the at least one remote unit; and determining how often the signal engages the limiter.

Example 15 includes the method of Example 14, wherein adjusting the operation of the at least one remote unit comprises adjusting a gain level for received signals in the remote unit based on the determination of how often the signal engages the limiter.

Example 16 includes the method of any of Examples 1-15, wherein adjusting the performance of the at least one remote unit during the normal operation phase comprises monitoring the at least one remote unit for a failure in at least one frequency band.

Example 17 includes the method of Example 16, wherein monitoring the at least one remote unit for failure of the at least one frequency band comprises monitoring operation of the at least one remote unit in the distributed antenna system; determining when a failure occurs in the at least one remote unit; and generating an alarm, wherein the alarm notifies a system controller for the distributed antenna system that a failure has occurred in the at least one remote unit.

Example 18 includes the method of Example 17, wherein adjusting the operation of the at least one remote unit comprises adjusting the operation of adjacent remote units in the distributed antenna system to compensate for the failure in the remote unit, wherein the adjacent remote units are spatially adjacent to the remote unit.

Example 19 includes the method of Example 18, wherein compensating for the failure in the remote unit comprises increasing transmission power of the at least one frequency band in the adjacent remote units.

Example 20 includes a distributed antenna system, the system comprising a host unit configured to control the operation of the distributed antenna system; a plurality of remote units coupled to the host unit, wherein a remote unit in the plurality of remote antenna units comprises a scanning receiver configured to receive signals in a plurality of frequency bands; at least one transceiver configured to transmit and receive signals in a frequency band in the plurality of frequency bands; and a remote unit controller configured to control an uplink gain level of the at least one transceiver and tune the scanning receiver to a frequency band in the plurality of frequency bands.

Example 21 includes the system of Example 20, wherein the scanning receiver digitizes the received signals and transmits them to the remote unit controller.

Example 22 includes the system of Example 21, wherein the remote unit controller processes the digitized signal to gather characterizing information, wherein the characterizing information describes the received signals.

Example 23 includes the system of Example 22, wherein the characterizing information describes at least one of a frequency for the received signals; an amplitude for the received signals; and a determination as to whether the signal is an interfering signal.

Example 24 includes the system of any of Examples 22-23, wherein the remote unit controller transmits the characterizing information to the host unit.

Example 25 includes the system of Example 24, wherein the host unit determines adjustments for the performance of the plurality of remote units based on the characterizing information received from each remote unit controller in the plurality of remote units.

Example 26 includes the system of any of Examples 20-25, wherein the remote unit controller is at least one of a field programmable gate array; a microcontroller; a digital signal processor; and a general purpose processor.

Example 27 includes the system of any of Examples 20-26, wherein the host unit is configured to compare reception power of remote antenna unit signals received by at least one remote unit, wherein the remote antenna unit signal was transmitted by a different remote antenna unit in the distributed antenna system.

Example 28 includes the system of any of Examples 20-27, wherein the host unit is configured to monitor the power of signals received in at least one remote antenna unit from an external signal source.

Example 29 includes the system of any of Examples 20-28, wherein the at least one transceiver comprises a power detector configured to measure the power of at least one of the transmitted signals and the received signals.

Example 30 includes a method for a adjusting the performance of a distributed antenna system, the method comprising tuning a receive frequency of a scanning receiver in a remote unit to receive signals in a frequency band, wherein the scanning receiver is tunable to receive signals in a plurality of frequency bands; measuring characteristics of the signals received in the plurality of frequency bands; transmitting the measured characteristics to a system controller; setting transmission power and uplink gain for at least one transceiver based on the measured characteristics, where the at least one transceiver is configured to communicate radio frequency signals with mobile devices.

Example 31 includes the method of Example 30, wherein measuring characteristics of the signal comprises determining whether the signal is an interfering signal; determining the frequency of the signal; determining the amplitude of the signal; and compiling the measured characteristics in a transmissible format.

Example 32 includes the method of Example 31, wherein the transmissible format comprises an information table.

Example 33 includes the method of Example 32, comprising transmitting the information table to a system controller for the remote unit.

Example 34 includes a remote unit, the remote unit comprising at least one transceiver configured to communicate radio frequency signals with mobile devices, wherein each transceiver in the at least one transceiver is configured to transmit and receive signals in a particular frequency band; a scanning receiver that is tunable to receive radio frequency signals in a plurality of frequency bands, wherein the plurality of frequency bands comprises frequency bands associated with the at least one transceiver; and a controller configured to tune the scanning receiver to a frequency band in the plurality of frequency bands.

Example 35 includes the system of Example 34, wherein the controller processes the digitized signal to gather characterizing information, wherein the characterizing information describes the received signals.

Example 36 includes the system of Example 35, wherein the characterizing information describes at least one of a frequency for the received signals; an amplitude for the received signals; and a determination as to whether the signal is an interfering signal.

Example 37 includes the system of any of Examples 35-36, wherein the remote unit controller transmits the characterizing information to a system controller for a distributed antenna system.

Example 38 includes the system of Example 37, wherein the controller receives adjustments for the at least one transceiver from the system controller.

Example 39 includes the system of any of Examples 34-38, wherein the controller is at least one of a field programmable gate array; a microcontroller; a digital signal processor; and a general purpose processor.

Example 40 includes the system of any of Examples 34-39, wherein the at least one transceiver comprises a power detector configured to measure the power of at least one of the transmitted signals and the received signals.

Example 41 includes the system of any of Examples 34-40, wherein the scanning receiver mixes the received radio frequency signals to an intermediate frequency before filtering.

Example 42 includes the system of any of Examples 34-41, wherein the scanning receiver provides both an in phase digital signal and a quadrature digital signal to the controller.

Example 43 includes the system of any of Examples 34-42, wherein the scanning receiver is operable during a startup phase for the remote unit and is not in operation during a normal operation phase of the remote unit.

Example 44 includes a method for adjusting the performance of a distributed antenna system, the method comprising transmitting a signal in a frequency band from a first transceiver in a first remote unit; tuning a second scanning receiver in a second remote unit to the frequency band, wherein the second remote unit includes the second scanning receiver and a second transceiver; determining a power level of the signal received at the second remote unit; and adjusting a transmission power level of the first transceiver in the first remote unit based on the determined power level.

Example 45 includes the method of Example 44, further comprising transmitting a second signal in a second frequency band from the second transceiver; tuning a first remote scanning receiver in the first remote unit to the second frequency band; determining a second power level of the second signal received at the first remote unit; and adjusting the second transmission power level of the second transceiver in the second remote unit based on the second power level.

Example 46 includes a method for adjusting the performance of a distributed antenna system, the method comprising receiving a signal from an external signal source, where the external signal source communicates with the distributed antenna system by communicating with a remote unit; monitoring a limiter in the remote unit; determining how often the signal engages the limiter; and adjusting a gain level for received signals in the remote unit based on the determination of how often the signal engages the limiter.

Example 47 includes the method of 46, wherein determining how often the signal engages the limiter comprises determining how often the limiter is engaged during a time period; determining that the gain level is too high when the limiter engages more times than a threshold limit for engagement of the limiter.

Example 48 includes a method for adjusting the performance of a distributed antenna system, the method comprising monitoring operation of a remote unit in the distributed antenna system; determining when a failure occurs in the remote unit; generating an alarm, wherein the alarm notifies a system controller for the distributed antenna system that a failure has occurred in the remote unit; and adjusting the operation of adjacent remote units in the distributed antenna system to compensate for the failure in the remote unit, wherein the adjacent remote units are spatially adjacent to the remote unit.

Example 49 includes the method of Example 48, wherein compensating for the failure in the remote unit comprises increasing transmission power of the at least one frequency band in the adjacent remote units.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for adjusting performance in a distributed antenna system, the method comprising:
   adjusting the performance of one or more remote units in the distributed antenna system during a startup phase based on a spectral environment of the one or more remote units, wherein the spectral environment is monitored with a scanning receiver on the one or more remote units; and
   adjusting the performance of the one or more remote units during a normal operation phase of the one or more remote units;
   wherein adjusting the performance of the one or more remote units during at least one of the startup phase and the normal operation phase comprises setting transmission power and uplink gain for one or more transceivers in the one or more remote units based on measurements of the spectral environment acquired by one or more scanning receivers in the one or more remote units,
   wherein setting the uplink gain for the one or more transceivers during the normal operation phase comprises at least one of:
   adjusting the uplink gain based on a number of times an uplink limiter engages within a specified time period; and adjusting the uplink gain based on a failure of one or more of the plurality of remote units;
wherein the one or more transceivers are configured to communicate radio frequency signals with mobile devices.

2. The method of claim 1, wherein adjusting the performance of the one or more remote units during the startup phase comprises scanning the spectral environment of the one or more remote units, the one or more remote units set to scan in at least one frequency band for an interfering signal.

3. The method of claim 2, wherein scanning the spectral environment for an interfering signal comprises:
tuning a receive frequency of the scanning receiver in the one or more remote units to receive signals in frequency band in the at least one frequency band;
measuring characteristics of the signal received in the frequency band; and
transmitting the measured characteristics to a system controller of the distributed antenna system.

4. The method of claim 3, wherein tuning the receive frequency comprises tuning the scanning receiver to receive signals in a plurality of different frequency bands.

5. The method of claim 3, wherein measuring characteristics of the signal comprises at least one of:
determining whether the signal is an interfering signal;
determining the frequency of the signal;
determining the amplitude of the signal; and
compiling the measured characteristics in a transmissible format.

6. The method of claim 5, wherein the transmissible format comprises an information table.

7. The method of claim 6, further comprising transmitting the information table to a system controller for the one or more remote units.

8. The method of claim 1, wherein adjusting the performance of the one or more remote units during the startup phase comprises comparing reception power of remote unit signals received by a remote unit in the one or more remote units, wherein the remote unit signal was transmitted by a different remote unit in the one or more remote units in the distributed antenna system.

9. The method of claim 8, wherein comparing reception power of remote antenna unit signals comprises:
transmitting a signal in a frequency band from one or more transceivers on a first remote unit in the one or more remote units;
tuning a second remote scanning receiver in a second remote unit in the one or more remote units to the frequency band, wherein the second remote unit includes at least one transceiver; and
determining a power level of the signal received at the second remote unit.

10. The method of claim 9, wherein adjusting the operation of the one or more remote units comprises adjusting a transmission power level of the transceiver in the first remote unit based on the determined power level.

11. The method of claim 9, further comprising:
transmitting a second signal in a second frequency band from at least one transceiver in the second remote unit;
tuning a first remote scanning receiver in the first remote unit to the second frequency band;
determining a second power level of the second signal received at the first remote unit; and
adjusting the second transmission power level of the at least one transceiver in the second remote unit based on the second power level.

12. The method of claim 1, wherein adjusting the performance of the one or more remote units during the normal operation phase comprises monitoring the power of signals received by the at least one remote unit from an external signal source.

13. A distributed antenna system, the system comprising:
a host unit configured to control the operation of the distributed antenna system;
a plurality of remote units coupled to the host unit, wherein a remote unit in the plurality of remote antenna units comprises:
a scanning receiver configured to receive a plurality of signals in a plurality of frequency bands;
at least one transceiver configured to transmit and receive signals in a frequency band in the plurality of frequency bands; and
a remote unit controller configured to control an uplink gain level of the at least one transceiver and tune the scanning receiver to a frequency band in the plurality of frequency bands, wherein the remote unit controller controls the uplink gain level during a normal operation phase for the plurality of remote units based on at least one of:
adjusting the uplink gain level based on a number of times an uplink limiter engages within a specified time period; and
adjusting the uplink gain level based on a failure of one or more of the plurality of remote units.

14. The system of claim 13, wherein the scanning receiver digitizes the received signals and transmits them to the remote unit controller.

15. The system of claim 14, wherein the remote unit controller processes the digitized signal to gather characterizing information, wherein the characterizing information describes the received signals.

16. The system of claim 15, wherein the characterizing information describes at least one of:
a frequency for the received signals;
an amplitude for the received signals; and
a determination as to whether the signal is an interfering signal.

17. The system of claim 15, wherein the remote unit controller transmits the characterizing information to the host unit.

18. The system of claim 17, wherein the host unit determines adjustments for the performance of the plurality of remote units based on the characterizing information received from each remote unit controller in the plurality of remote units.

19. The system of claim 13, wherein the remote unit controller is at least one of:
a field programmable gate array;
a microcontroller;
a digital signal processor; and
a general purpose processor.

20. The system of claim 13, wherein the host unit is configured to compare reception power of remote antenna unit signals received by one or more remote units in the plurality of remote units, wherein the remote antenna unit signal was transmitted by a different remote antenna unit in the distributed antenna system.

21. The system of claim 13, wherein the host unit is configured to monitor the power of signals received in one or more remote antenna units in the plurality of remote units from an external signal source.

22. The system of claim 13, wherein the at least one transceiver comprises a power detector configured to measure the power of at least one of the transmitted signals and the received signals.

23. A method for adjusting the performance of a distributed antenna system, the method comprising:
- tuning a receive frequency of a scanning receiver in one or more remote units to receive signals in a frequency band, wherein the scanning receiver is tunable to receive signals in a plurality of frequency bands;
- measuring characteristics of the signals received in the plurality of frequency bands;
- transmitting the measured characteristics to a system controller;
- setting transmission power and uplink gain for at least one transceiver in the one or more remote units based on-the measured characteristics and setting the uplink gain during a normal operation phase based on at least one of:
  - a number of times an uplink limiter engages within a specified time period; and
  - a failure of one or more of the one or more remote units;
- wherein the at least one transceiver is configured to communicate radio frequency signals with mobile devices.

24. The method of claim 23, wherein measuring characteristics of the signal comprises at least one of:
- determining whether the signal is an interfering signal;
- determining the frequency of the signal;
- determining the amplitude of the signal; and
- compiling the measured characteristics in a transmissible format.

25. The method of claim 24, wherein the transmissible format comprises an information table.

26. The method of claim 25, comprising transmitting the information table to a system controller for the one or more remote unit.

27. A remote unit, the remote unit comprising:
- at least one transceiver configured to communicate radio frequency signals with mobile devices, wherein each transceiver in the at least one transceiver is configured to transmit and receive signals in a particular frequency band;
- a scanning receiver that is tunable to receive radio frequency signals in a plurality of frequency bands, wherein the plurality of frequency bands comprises frequency bands associated with the at least one transceiver; and
- a controller configured to tune the scanning receiver to a frequency band in the plurality of frequency bands, wherein the controller sets an uplink gain for the at least one transceiver during a normal operation phase based on at least one of:
- a number of times an uplink limiter engages within a specified time period; and
- a failure of another remote unit.

28. The system of claim 27, wherein the controller processes the digitized signal to gather characterizing information, wherein the characterizing information describes the received signals.

29. The system of claim 28, wherein the characterizing information describes at least one of:
- a frequency for the received signals;
- an amplitude for the received signals; and
- a determination as to whether the signal is an interfering signal.

30. The system of claim 28, wherein the remote unit controller transmits the characterizing information to a system controller for a distributed antenna system.

31. The system of claim 30, wherein the controller receives adjustments for the at least one transceiver from the system controller.

32. The system of claim 27, wherein the controller is at least one of:
- a field programmable gate array;
- a microcontroller;
- a digital signal processor; and
- a general purpose processor.

33. The system of claim 27, wherein the at least one transceiver comprises a power detector configured to measure the power of at least one of the transmitted signals and the received signals.

34. The system of claim 27, wherein the scanning receiver mixes the received radio frequency signals to an intermediate frequency before filtering.

35. The system of claim 27, wherein the scanning receiver provides both an in phase digital signal and a quadrature digital signal to the controller.

36. The system of claim 27, wherein the scanning receiver is operable during a startup phase for the remote unit and is not in operation during a normal operation phase of the remote unit.

37. A method for adjusting the performance of a distributed antenna system, the method comprising:
- transmitting a signal in a frequency band from a first transceiver in a first remote unit;
- tuning a second scanning receiver in a second remote unit to the frequency band, wherein the second remote unit includes the second scanning receiver and a second transceiver,
- determining a power level of the signal received at the second remote unit; and
- adjusting a transmission power level of the first transceiver in the first remote unit based on the determined power level; and
- adjusting an uplink gain for the first transceiver during the normal operation phase of the first transceiver based on at least one of:
  - a number of times an uplink limiter engages within a specified time period; and
  - a failure of the second remote unit.

38. The method of claim 37, further comprising:
- transmitting a second signal in a second frequency band from the second transceiver;
- tuning a first remote scanning receiver in the first remote unit to the second frequency band;
- determining a second power level of the second signal received at the first remote unit; and
- adjusting the second transmission power level of the second transceiver in the second remote unit based on the second power level.

* * * * *